United States Patent
Ho et al.

(10) Patent No.: US 10,185,494 B2
(45) Date of Patent: Jan. 22, 2019

(54) METHOD AND ASSOCIATED APPARATUS FOR MANAGING A STORAGE SYSTEM WITH AID OF HYBRID MANAGEMENT PATHS

(71) Applicant: Synology Incorporated, Taipei (TW)

(72) Inventors: Chi-Lei Ho, Tainan (TW); Shih-Kai Tsai, New Taipei (TW)

(73) Assignee: Synology Incorporated, Taipei (TW)

( * ) Notice: Subject to any disclaimer, the term of this patent is extended or adjusted under 35 U.S.C. 154(b) by 216 days.

(21) Appl. No.: 15/162,622

(22) Filed: May 24, 2016

(65) Prior Publication Data

US 2017/0010822 A1    Jan. 12, 2017

(30) Foreign Application Priority Data

Jul. 6, 2015   (TW) .............................. 104121903 A

(51) Int. Cl.
*G06F 3/06* (2006.01)
*G06F 11/20* (2006.01)
*G06F 11/30* (2006.01)

(52) U.S. Cl.
CPC .......... *G06F 3/0607* (2013.01); *G06F 3/0635* (2013.01); *G06F 3/0653* (2013.01); *G06F 3/0685* (2013.01); *G06F 11/2043* (2013.01); *G06F 11/3058* (2013.01)

(58) Field of Classification Search
CPC ..... G06F 3/0607; G06F 3/0635; G06F 3/0653
See application file for complete search history.

(56) References Cited

U.S. PATENT DOCUMENTS

| | | |
|---|---|---|
| 6,591,758 B2 | 7/2003 | Kumar |
| 6,973,880 B2 | 12/2005 | Kumar |
| 7,043,663 B1 | 5/2006 | Pittelkow |
| 2004/0007404 A1 | 1/2004 | Schmitz |
| 2006/0005737 A1 | 1/2006 | Kumar |
| 2007/0255900 A1 | 11/2007 | Lee |

(Continued)

FOREIGN PATENT DOCUMENTS

| | | |
|---|---|---|
| CN | 1592231 A | 3/2005 |
| CN | 103533058 A | 1/2014 |

(Continued)

*Primary Examiner* — Adam M Queler
*Assistant Examiner* — Edmund H Kwong
(74) *Attorney, Agent, or Firm* — Winston Hsu

(57) ABSTRACT

A method for managing a storage system includes: providing at least one heartbeat monitoring path between a set of expander control circuits within an expansion module in the storage system, for transmitting at least one of a plurality of heartbeat monitoring signals for a set of management modules in the storage system, wherein the expansion module is utilized for installing a set of shared storage devices, and each shared storage device within the set of shared storage devices is coupled to the set of expander control circuits, respectively, to allow the management modules to control the set of shared storage devices through the expander control circuits, respectively. The method further includes performing heartbeat monitoring according to the heartbeat monitoring signals, for at least one of the management modules to perform high availability management on shared storage devices and selectively take over management of non-shared components.

18 Claims, 9 Drawing Sheets

(56) References Cited

U.S. PATENT DOCUMENTS

| | | | | |
|---|---|---|---|---|
| 2008/0062630 A1* | 3/2008 | Elliott | ................... | G06F 3/0607 |
| | | | | 361/679.33 |
| 2008/0244620 A1* | 10/2008 | Cagno | ................... | G06F 11/201 |
| | | | | 719/326 |
| 2012/0239888 A1* | 9/2012 | Ilzuka | ................. | G06F 11/2005 |
| | | | | 711/154 |
| 2013/0159773 A1* | 6/2013 | Harada | ............... | G06F 11/0784 |
| | | | | 714/32 |
| 2015/0039932 A1* | 2/2015 | Kaufmann | ............ | G06F 11/201 |
| | | | | 714/6.2 |

FOREIGN PATENT DOCUMENTS

| | | | |
|---|---|---|---|
| WO | 2007081437 | A1 | 7/2007 |
| WO | 2010056242 | A1 | 5/2010 |

* cited by examiner

METHOD AND ASSOCIATED APPARATUS FOR MANAGING A STORAGE SYSTEM WITH AID OF HYBRID MANAGEMENT PATHS

BACKGROUND OF THE INVENTION

1. Field of the Invention

The present invention relates to high availability (HA) management, such as utilizing a Serial Attached Small Computer System Interface (Serial Attached SCSI or SAS) technique to implement the HA management of a storage system. More particularly, the present invention relates to a method for managing a storage system by utilizing a hybrid management path, and an associated apparatus thereof.

2. Description of the Related Art

Network services are necessary features of modern life. Problems such as elopement failures, operation errors or system breakdowns may cause the server to malfunction, which may interrupt the service. This increases the cost involved in network services.

A high availability (HA) scheme may prevent some types of network services from being interrupted, but additional problems may be introduced. In an example, two servers in the HA scheme may need a network to monitor each other. When the network is interrupted or unstable, errors may occur during monitoring operations, disrupting normal function of the HA scheme. In another example, in order to make the two servers of the HA scheme monitor each other, an additional server may be required for performing the monitoring operations, which increases the related cost. If one of the two servers breaks down and is unable to control a corresponding control circuit in an enclosure thereof, some part of the enclosure may lose the function of automatic temperature adjustment, which raises the possibility of the storage device in the enclosure breaking down. A related art solution applies an additional fan sensor and an additional fan controller, but this configuration also raises the cost.

It can be seen from the above that related art solutions cannot solve the existing problems without introducing side effects. Hence, there is a need for a novel method and an associated scheme which can properly solve the existing problems with only minimal side effects.

SUMMARY OF THE INVENTION

An objective of the present invention is to provide a method and an associated apparatus for managing a storage system by utilizing a hybrid management path in order to solve the above problems.

Another objective of the present invention is to provide a method and an associated apparatus for managing a storage system by utilizing a hybrid management path in order to reduce the possibility of malfunction of the storage system.

Yet another objective of the present invention is to provide a method and an associated apparatus for managing a storage system by utilizing a hybrid management path in order to properly control a high availability (HA) cluster to function well.

At least one referred embodiment of the present invention provides a method for managing a storage system by utilizing a hybrid management path. The storage system comprises a plurality of shared storage devices. The method comprises: providing at least one heartbeat monitoring path between a first set of expander control circuits within a first expansion module in the storage system, for transmitting at least one of a plurality of heartbeat monitoring signals for a set of management modules in the storage system, wherein the expansion module is utilized for installing a first shared storage device set of a plurality of shared storage devices, and each shared storage device within the first shared storage device set is coupled to the first set of expander control circuits, respectively, to allow the set of management modules to control the first shared storage device set through the first set of expander control circuits, respectively. The method further comprises performing heartbeat monitoring upon the set of management modules according to the heartbeat monitoring signals, to enable at least one of the management modules to perform high availability management upon the plurality of shared storage devices, and selectively take over management of at least one non-shared component within the first expansion module, wherein the storage system is constructed as a high availability cluster.

In addition to the above method, the present invention also provides an apparatus for managing a storage system by utilizing a hybrid management path. The storage system comprises a plurality of shared storage devices. The apparatus comprises a first expansion module positioned in the storage system. The first expansion module is arranged to install a first shared storage device set (e.g. a first set of shared storage devices) of the plurality of shared storage devices. The first expansion module comprises a first set of expander control circuits and at least one heartbeat monitoring path. The first set of expander control circuits is coupled to a set of management modules in the storage system, wherein each shared storage device in the first shared storage device set is coupled to the first set of expander control circuits, to allow the set of management modules to control the first shared storage device set through the first set of expander control circuits, respectively. The heartbeat monitoring path is positioned between the first set of expander control circuits. The heartbeat monitoring path is arranged to transmit at least one of a plurality of heartbeat monitoring signals for the set of management modules. The hybrid management paths comprise the heartbeat monitoring path. The apparatus performs heartbeat monitoring upon the set of management modules according to the plurality of heartbeat monitoring signals, for at least one of the management modules to perform high availability management upon the plurality of shared storage devices, and selectively take over management of at least one non-shared component within the first expansion module, wherein the storage system is constructed as a high availability cluster The method and the associated apparatus provided by the present invention may properly solve the existing problems without introducing side effects. Further, the method and the associated apparatus provided by the present invention may reduce the possibility of malfunction of the storage system. For example, the HA cluster may ensure continuous storage space service and maximum system availability, which can reduce an unexpected interruption and the risk of shutting down the machine. With the method and the associated apparatus provided by the present invention, continuous availability can be easily achieved. Hence, additional costs and time for maintaining the storage system may be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
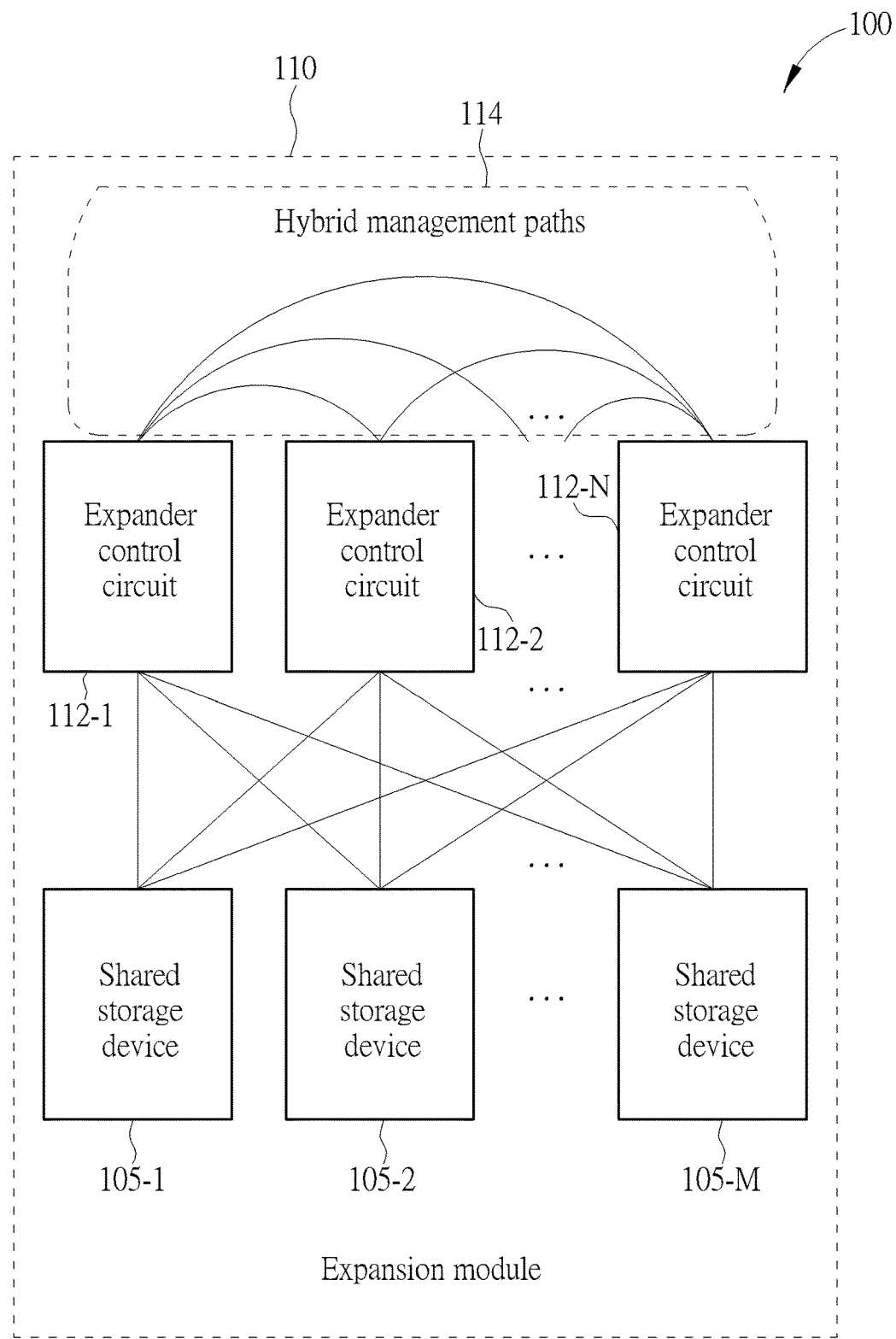
FIG. 1 is a diagram illustrating an apparatus for managing a storage system by utilizing a hybrid management path according to an embodiment of the present invention.

FIG. 1 is a diagram illustrating an apparatus 100 for managing a storage system by utilizing a hybrid management (HA) path according to an embodiment of the present invention, wherein the storage system comprises a plurality of shared storage devices (e.g. a plurality of hard drives). According to this embodiment, the apparatus 100 may comprise at least a portion (e.g. part or all) of a plurality of electronic devices of the storage system, and the plurality of shared storage devices (e.g. a plurality of hard drives) of the storage system may be positioned in at least one of the electronic devices. For example, the apparatus 100 may be one or more control circuits of some of the plurality of shared storage devices, such as one or more integrated circuits (ICs) within the aforementioned one or more electronic devices. In another example, the apparatus 100 may be a whole electronic device within the plurality of electronic devices. In yet another example, the apparatus 100 may be at least two electronic devices within the plurality of electronic devices. In yet another example, the apparatus 100 may be the whole storage system. An exemplary storage system may comprise (but is not limited to) a data storage system implemented with a Serial Attached Small Computer System Interface, SAS) technique or the SAS Expander technique. Examples of the plurality of electronic devices may comprise a header or an enclosure implemented with the SAS expander.

As shown in FIG. 1, the apparatus 100 comprises an expansion module 110 positioned in the storage system and arranged to install a set of shared storage devices {105-1, 105-2, ..., 105-M} within the plurality of shared storage devices, wherein M may be an integer larger than 1. For example, the expansion module 110 may comprise a set of expander control circuits {112-1, 112-2, ..., 112-N} coupled to a set of management modules in the storage system, wherein N may be an integer larger than 1. The apparatus 100 also comprises at least one set of hybrid management paths 114 (which may be an example of the aforementioned hybrid management path), such as one or multiple sets of hybrid management paths positioned between the set of expander control circuits {112-1, 112-2, ..., 112-N}, wherein a set of hybrid management paths is positioned between any two of the set of expander control circuits {112-1, 112-2, ..., 112-N}. For brevity, one set of hybrid management paths is depicted as one curve in FIG. 1, which represents multiple signal paths. For example, each set of hybrid management paths in the aforementioned hybrid management paths 114 may comprise: a plurality of heartbeat monitoring paths (such as two heartbeat monitoring paths in opposite directions); at least one fan fail (FF) monitoring path such as a two-directional fan fail monitoring path, or two fan fail monitoring paths corresponding to opposite directions. The apparatus 100 also comprises at least one pulse width modulation (PWM) control path, such as a two-directional PWM control path, or two PWM control paths corresponding to opposite directions.

More particularly, each shared storage device of the set of shared storage devices, such as a shared storage device 105-m (wherein m may be any positive integer with [1, M]) within the set of shared storage devices {105-1, 105-2, ..., 105-M}, may be coupled to the set of expander control circuits {112-1, 112-2, ..., 112-N}, respectively, to allow the set of management modules to control the set of shared storage devices {105-1, 105-2, ..., 105-M} through the set of expander control circuits {112-1, 112-2, ..., 112-N}, respectively. Further, the heartbeat monitoring paths in the aforementioned at least one set of hybrid management paths 114 may be used to transmit at least one (e.g. one or more) heartbeat monitoring signal of a plurality of heartbeat monitoring signals for the set of management modules. The apparatus 100 may refer to the plurality of heartbeat monitoring signals to perform heartbeat monitoring upon the set of management modules, for the plurality of shared storage devices {105-1, 105-2, ..., 105-M} in the set of management modules to perform a high availability (HA) management operation. The storage system may be constructed as an HA Cluster. More particularly, any of the set of management modules can replace another of the set of management modules, and can independently control the plurality of shared storage devices.

Note that any of the set of management modules may be an example of the plurality of electronic devices, and the expansion module 110 may also be an example of one of the plurality of electronic devices.

In practice, each set of management modules may refer to the SAS expander technique to operate as the aforementioned enclosure in this embodiment. Further, any electronic device (e.g. the expansion module 110) of the plurality of electronic devices except for the set of management modules, may refer to the SAS expander technique to operate as the enclosure mentioned in this embodiment, wherein each expander control circuit of the set of expander control circuits {112-1, 112-2, ..., 112-N}, such as an expander control circuit 112-n (where n may be a positive integer within [1, N]), may comprise at least one interface circuit, and the interface circuit may refer to the SAS expander technique to operate as a corresponding SAS interface circuit. In addition, any of the first set of expander control circuits may be electrically connected to a corresponding management module within the set of management modules through a cable (e.g. an SAS cable).

According to this embodiment, the set of hybrid management paths 114 (more particularly the heartbeat monitoring paths therein) between the set of expander control circuits {112-1, 112-2, ..., 112-N} comprises at least one internal wiring in the expansion module 110, rather than a network cable between the set of management modules. Hence, the apparatus 100 may avoid various issues present in the related arts, such as loosening or inner breakage of the network cable.

According to some embodiments, the storage system may comprise a plurality of copies of the expansion module 110, such as a first expansion module 110-1 and second expansion module 110-2, etc. For example, each of the set of management modules may refer to the SAS expander technique to operate as the enclosure mentioned in this embodiment. Any electronic device except for the set of management modules within the plurality of electronic devices, such as the first expansion module 110-1, may refer to the SAS expander technique to operate as the enclosure mentioned in this embodiment.

Figure 2:
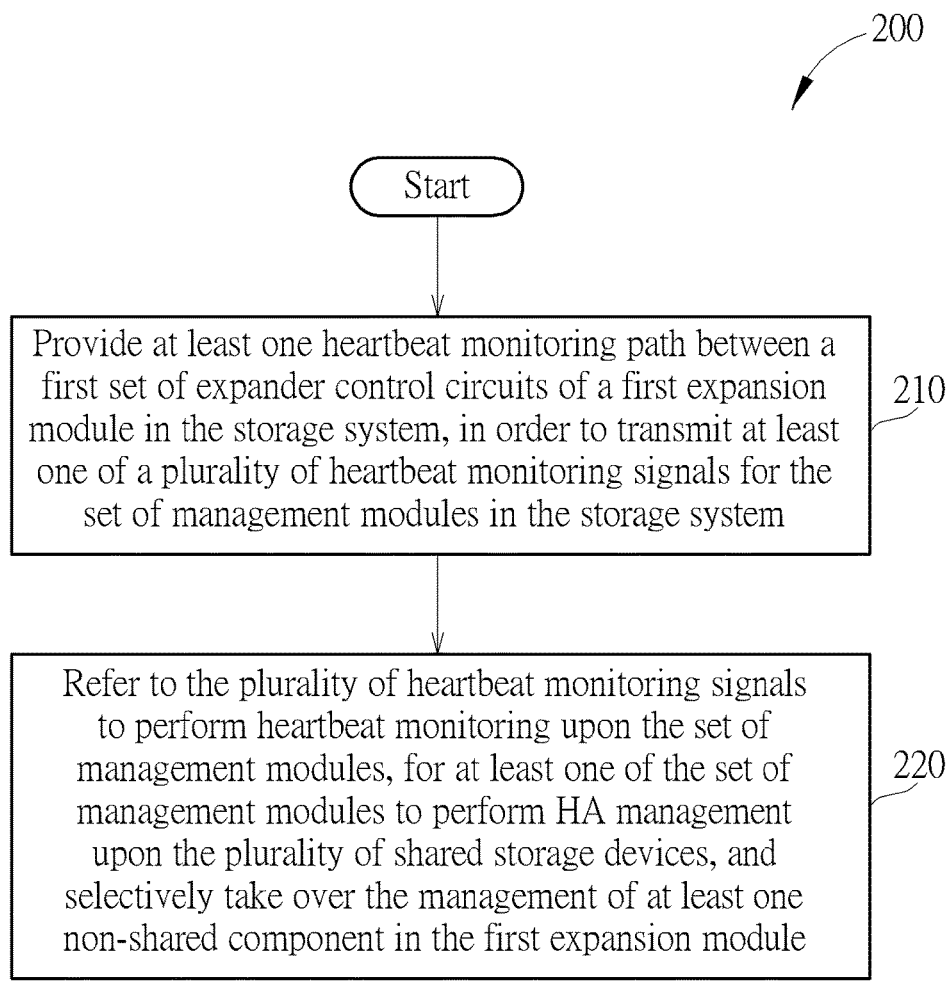
FIG. 2 is a flowchart illustrating a method for managing a storage system by utilizing a hybrid management path according to an embodiment of the present invention.

FIG. 2 is a flowchart illustrating a method 200 for managing a storage system by utilizing a hybrid management path according to an embodiment of the present invention. The method can be applied to the apparatus 100 shown in FIG. 1, and more particularly, to the aforementioned expansion module 110 and/or the copies thereof. The method is described as follows.

In Step 210, the apparatus 100 provides at least one heartbeat monitoring path between a first set of expander control circuits of a first expansion module 110-1 in the storage system, in order to transmit at least one of a plurality of heartbeat monitoring signals for the set of management modules in the storage system, wherein the first expansion module 110-1 is arranged to install a first shared storage device set (e.g. a first set of hard drives) within the plurality of shared storage devices, and each shared storage device of the first shared storage device set is coupled to the first set of expander control circuits, to allow the set of management modules to control the first shared storage device set through the first set of expander control circuits, respectively. For example, the hybrid management paths may comprise the heartbeat monitoring path between the first set of expander control circuits.

The first set of expander control circuits may be an example of the set of expander control circuits {112-1, 112-2, ..., 112-N}, the heartbeat monitoring path mentioned in Step 210 may be an example of the heartbeat monitoring path of the aforementioned set of hybrid management paths 114, and the first shared storage device set may be an example of the set of shared storage devices {105-1, 105-2, ..., 105-M}.

In Step 220, the apparatus 100 refers to the plurality of heartbeat monitoring signals to perform heartbeat monitoring upon the set of management modules, for at least one of the set of management modules to perform HA management upon the plurality of shared storage devices, and selectively take over the management of at least one non-shared component in the first expansion module 110-1 (or any other expansion module in the storage system as long as there is one), wherein the storage system is constructed as an HA cluster. For example, multiple hardware components in any expander control circuit of the first set of expander control circuits may be viewed as a non-shared component. This is because each of the multiple hardware components belongs to the expander control circuit, rather than being shared to the first set of expander control circuits. In another example, any expander control circuit in the first set of expander control circuits may include at least one fan, and the fan is electrically coupled to some hardware components in the expander control circuit, and can be viewed as a non-shared component. This is because the fan belongs to the expander control circuit, rather than being shared to the first set of expander control circuits.

In practice, the set of management modules may comprise at least two management modules, such as the enclosures HOST1 and HOST2 implemented by the SAS expander technique, and the first set of expander control circuits may comprise at least two expander control circuits, such as the expanders EXPANDER1 and EXPANDER2 implemented by the SAS expander technique. Further, the first expansion module 110-1 is implemented as an enclosure according to the SAS expander technique, for configuring the first set of expander control circuits and the first shared storage device set. Moreover, the first set of expander control circuits (e.g. the expanders EXPANDER1 and EXPANDER2) may be electrically coupled to the set of management modules (such as the enclosures HOST1 and HOST2) through the SAS cables, respectively.

According to some embodiments, one of the set of management modules may utilize a corresponding expander control circuit of the first set of expander control circuits to take over the management of the non-shared component of the first expansion module, wherein the non-shared component of the first expansion module locates at another expander control circuit of the first set of expander control circuits, or is coupled to the corresponding expander control circuit of the first set of expander control circuits through the other expander control circuit. For example, the non-shared component of the first expansion module may comprise at least one hardware component in the other expander control circuit. In another example, the non-shared component in the first expansion module may comprise a fan. More particularly, the first expansion module may comprise at least one FF monitoring path, which may be an example of the FF monitoring path in each set of hybrid management paths of the set of hybrid management paths 114. The FF monitoring path locates between the first set of expander control circuits, and may be used to transmit a fan fail (FF) monitoring signal corresponding to the fan from the other expander control circuit of the first set of expander control circuits to the corresponding expander control circuit of the first set of expander control circuits to monitor whether the fan fails or not. The hybrid management paths may comprise the FF monitoring path of the first expansion module, and the management module of the set of management modules may utilize the corresponding expander control circuit in the first set of expander control circuits. Further, the first expansion module may comprise at least one PWM control path located between the first set of expander control circuits. The PWM control path may be used to transmit a pulse width modulation (PWM) control signal corresponding to the fan from the corresponding expander control circuit of the first set of expander control circuits to the other expander control circuit of the first set of expander control circuits to take over the management of the fan according to the PWM control signal. The hybrid management paths may comprise the PWM control path of the first expansion module, and the management module of the set of management modules may utilize the corresponding expander control circuit of the first set of expander control circuits.

According to some embodiments, the expansion module amount may be larger than 1. For example, the apparatus 100 may provide at least one heartbeat monitoring path between a second set of expander control circuits of the second expansion module 110-2 of the storage system, for the set of management modules of the storage system to transmit at least another of the plurality of heartbeat monitoring signals. The second expansion module 110-2 is arranged to install a second shared storage device set (e.g. a second set of shared storage devices) of the plurality of shared storage devices, and each of the second shared storage device set may be coupled to the second set of expander control circuits, respectively, to allow the set of management modules to control the second shared storage device set through the second set of expander control circuits, respectively. The hybrid management paths may comprise the heartbeat monitoring path between the second set of expander control circuits.

According to some embodiments, one of the set of management modules may utilize a corresponding expander control circuit of the second set of expander control circuits to take over the management of at least one non-shared component of the second expansion module, wherein the non-shared component of the second expansion module locates at another expander control circuit of the second set of expander control circuits, or is coupled to the corresponding expander control circuit through the other expander control circuit. The non-shared component in the second expansion module may comprise at least one hardware component in the other expander control circuit. In another example, the non-shared component of the second expansion module may comprise a fan. More particularly, the second expansion module may comprise at least one FF monitoring path located between the second set of expander control circuits. The FF monitoring path may be used to transmit an FF monitoring signal corresponding to the fan from the other expander control circuit of the second set of expander control circuits to the corresponding expander control circuit of the second set of expander control circuits, to monitor whether the fan fails or not according to whether the FF monitoring signal is received. The hybrid management paths comprises the FF monitoring path of the second expansion module, and the management module of the set of management modules may utilize the corresponding expander control circuit in the second set of expander control circuits. Further, the second expansion module may comprise at least one PWM control path located between the second set of expander control circuits. The PWM control path may be used to transmit a PWM control signal corresponding to the fan from the corresponding expander control circuit in the second set of expander control circuits to the other expander control circuit in the second set of expander control circuits, to take over the management of the fan according to the PWM control signal. The hybrid management paths comprise the PWM control path of the second expansion module, and the management module of the set of management modules may utilize the corresponding expander control circuit of the second set of expander control circuits.

Note that the second set of expander control circuits may also be an example of the set of expander control circuits {112-1, 112-2, ..., 112-N}; the heartbeat monitoring path provided between the second set of expander control circuits by the apparatus 100 may also be an example of the heartbeat monitoring paths in the aforementioned set of hybrid management paths 114; and the second shared storage device set may also be an example of the set of shared storage devices {105-1, 105-2, ..., 105-M}. Further, the second set of expander control circuits may also comprise at least two expander control circuits, such as the copies of the aforementioned two expanders EXPANDER1 and EXPANDER2. Further, the second expansion module 110-2 may also refer to the SAS expander technique to be implemented as an enclosure for configuring the second set of expander control circuits and the second shared storage device set. Moreover, the second set of expander control circuits (e.g. the copies of the aforementioned two expanders EXPANDER1 and EXPANDER2) may be electrically connected to the first set of expander control circuits (e.g. the aforementioned two expanders EXPANDER1 and EXPANDER2) through the SAS cables, respectively.

According to some embodiments, the apparatus 100 may utilize one of the set of management modules to transmit a survival command to an expander control circuit of the first set of expander control circuits, for the expander control circuit to decide whether to notify another expander control circuit of the first set of expander control circuits of a survival state or a non-survival state of the management module, in order to allow another management module of the set of management modules to know the survival state or the non-survival state of the management module. For example, the management module and the other management module may be the enclosures HOST1 and HOST2, respectively, and the expander control circuit and the other expander control circuit may be the expanders EXPANDER1 and EXPANDER2, respectively.

According to some embodiments, the apparatus 100 may utilize one management module of the set of management modules to transmit a reading command to an expander control circuit of the first set of expander control circuits, in order to know whether the another management module in the set of management modules survives or not through the expander control circuit, another expander control circuit in the first set of expander control circuits, and a heartbeat monitoring path between the expander control circuit and the other expander control circuit. The heartbeat monitoring path between the first set of expander control circuits may comprise the heartbeat monitoring path between the expander control circuit and the other expander control circuit. For example, the management module and the other management module may be the enclosures HOST1 and HOST2, respectively, and the expander control circuit and the other expander control circuit may be the expanders EXPANDER1 and EXPANDER2, respectively.

According to some embodiments, when an expander control circuit of the first set of expander control circuits receives a reading command from a corresponding management module of the set of management modules, the expander control circuit may set an output terminal of the expander control circuit as a first logic state, to inform another expander control circuit of the first set of expander control circuits of a survival state of the management module, to thereby allow another management module of the set of management modules to know the survival state of the management module. For example, the management module and the other management module may be the enclosures HOST1 and HOST2, respectively, and the expander control circuit and the other expander control circuit may be the expanders EXPANDER1 and EXPANDER2, respectively. The expander control circuit may set the logic state of the output terminal by adjusting the voltage level of the output terminal. Since the method of using the expander control circuit to set the logic state of the output terminal is known by one skilled in the art, the derailed descriptions thereof are omitted here for brevity.

According to some embodiments, when an expander control circuit of the first set of expander control circuits receives a reading command of a corresponding management module from the set of management modules, the expander control circuit may read a signal of an input terminal of the expander control circuit to know the logic state of an output terminal of another expander control circuit set by the other expander control circuit, such as a first logic state or a second logic state which may be different from the first logic state. The logic state may indicate a survival state or a non-survival state of another management module in the set of management modules, and the input terminal of the expander control circuit is coupled to the output terminal of the other expander control circuit. For example, the other expander control circuit may selectively set the output terminal of the other expander control circuit as the first logic state or the second logic state, to correspondingly indicate the survival state or the non-survival state of the other management module. Hence, the management module may refer to the signal read from the input terminal of the expander control circuit, to know whether the other management module is at the survival state or the non-survival state. The survival state and the non-survival state correspond to the first logic state and the second logic state, respectively. For example, the management module and the other management module are the enclosures HOST1 and HOST2, respectively, and the expander control circuit and the other expander control circuit may be the expanders EXPANDER1 and EXPANDER2, respectively.

According to some embodiments, when an expander control circuit of the first set of expander control circuits receives a survival command from a corresponding management module of the set of management modules, the expander control circuit may set an output terminal of the expander control circuit as a first logic state, to inform another expander control circuit in the first set of expander control circuits of a survival state of the management module. This allows another management module in the set of management modules to know the survival state of the management module through the other expander control circuit. For example, the management module and the other management module may be the enclosures HOST1 and HOST2, respectively, and the expander control circuit and the other expander control circuit may be the expanders EXPANDER1 and EXPANDER2, respectively.

According to some embodiments, when an expander control circuit in the first set of expander control circuits does not receive a survival command from a corresponding management module in the set of management modules for a predetermined threshold of time, the expander control circuit may set an output terminal of the expander control circuit as a second logic state different from the first logic state, to inform another expander control circuit of the first set of expander control circuits of a non-survival state of the management module, to thereby allow another management module of the set of management modules to know the non-survival state of the management module. The management module may periodically transmit the survival command to the corresponding expander control circuit of the first set of expander control circuits. For example, the management module and the other management module may be the enclosures HOST1 and HOST2, respectively, and the expander control circuit and the other expander control circuit may be the expanders EXPANDER1 and EXPANDER2, respectively.

According to some embodiments, in any expander control circuit of the storage system (e.g. any of the first set of expander control circuits), the default logic state of an output terminal of a survival/non-survival state for indicating a specific management module is a second logic state, in order to simulate the non-survival state (of the management module. Hence, when a problem occurs, such as the firmware is abnormal, the output terminal of the expander control circuit will enter the second logic state. For example, the management module may be the enclosure HOST1, and the expander control circuit may be the expander EXPANDER1.

Figure 3:
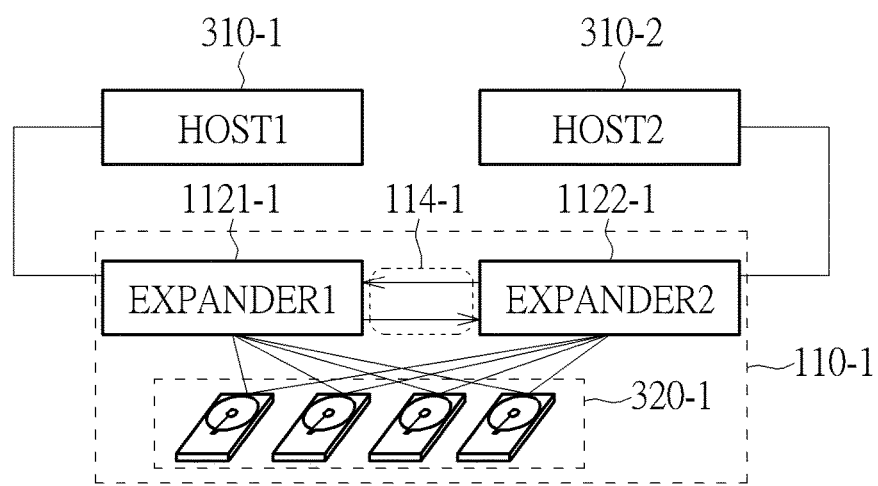
FIG. 3 is a diagram illustrating an HA management and control scheme related to the method shown in FIG. 2.

FIG. 3 is a diagram illustrating an HA management and control scheme related to the method 200 shown in FIG. 2 according to an embodiment of the present invention. As shown in FIG. 3, the management modules 310-1 and 310-2 (denoted as HOST1 and HOST2, respectively) may be implemented as the aforementioned two enclosures HOST1 and HOST2, and may be an example of the set of management modules. Further, the expander control circuits 1121-1 and 1122-1 (denoted as EXPANDER1 and EXPANDER2) may be implemented as the aforementioned two expanders EXPANDER1 and EXPANDER2, and may be an example of the first set of expander control circuits. The first expansion module 110-1 in this embodiment may be implemented as an enclosure for configuring the expander control circuits 1121-1 and 1122-1 and the first set of hard drives (e.g. the hard drive 320-1), wherein the expander control circuits 1121-1 and 1122-1 may be electrically coupled to the management modules 310-1 and 310-2 through the SAS cable, respectively.

According to this embodiment, signal transmissions on the heartbeat monitoring path between the first set of expander control circuits may be implemented by utilizing a general purpose input/output (GPIO) control unit in the expander control circuit 1121-1, a GPIO control unit in the expander control circuit 1122-1, and multiple wirings between the GPIO control unit in the expander control circuit 1121-1 and the GPIO control unit in the expander control circuit 1122-1. For example, the hybrid management paths 114-1 may be installed in a printed circuit board (PCB) of the first expansion module 110-1, such as the back panel of the first expansion module 110-1, wherein the expander control circuits 1121-1 and 1122-1 are coupled to the backboard, respectively. Note that the hybrid management paths 114-1 between the expander control circuits 1121-1 and 1122-1 are internal wirings in the first expansion module 110-1, and not a network cable between the set of management modules (e.g. the management modules 310-1 and 310-2).

The cables between the enclosure HOST1, HOST2 and the expanders EXPANDER1, EXPANDER2 are standard SAS cables. The set of hybrid management paths between the expanders EXPANDER1 and EXPANDER2 (e.g. the heartbeat monitoring paths, the FF monitoring path and the PWM control path between the expanders EXPANDER1 and EXPANDER2) may be implemented as a simple and durable scheme, such as the internal wirings and the input/output terminals of the internal wirings (i.e. the respective input/output terminals of the expanders EXPANDER1 and EXPANDER2). Hence, the scheme shown in FIG. 3 is reliable for heartbeat monitoring, and may avoid problems existing in related arts (e.g. the network is unstable and thus requires another server, an additional hard disk, or nonstandard wirings). Further, the scheme may take over the operation mentioned in Step 220, such as selectively taking over the management of the non-shared component in the first expansion module 110-1 (or any other expansion module in the storage system).

Figure 4:
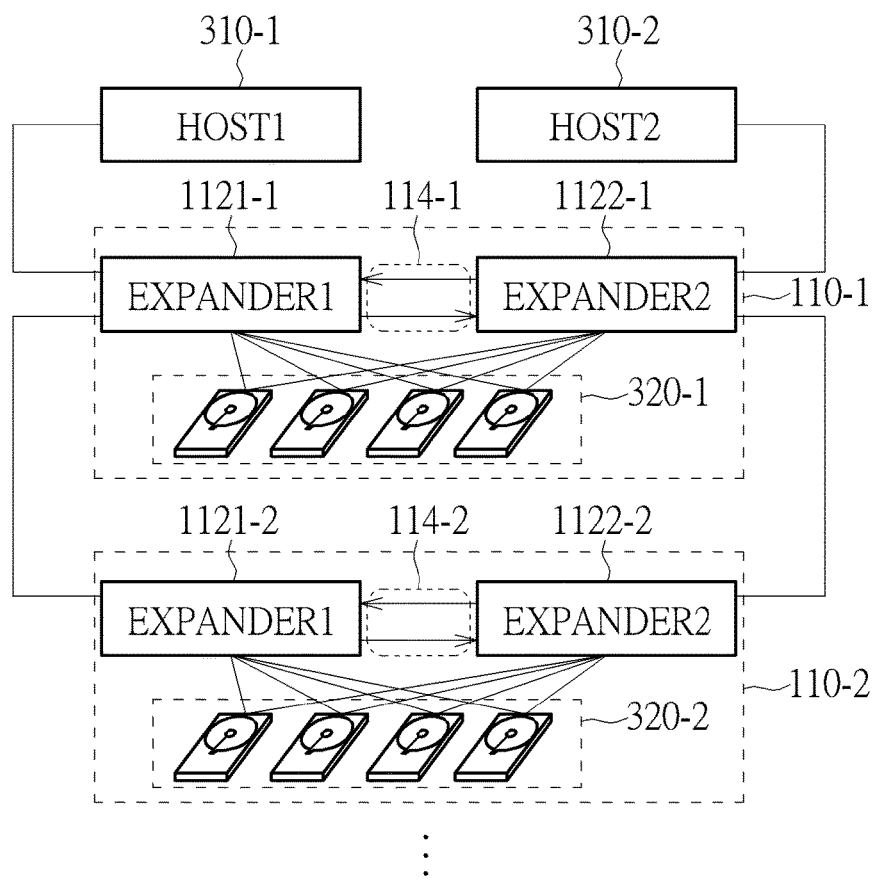
FIG. 4 is a diagram illustrating a control scheme related to the method shown in FIG. 2.

FIG. 4 is a diagram illustrating an HA management and control scheme related to the method 200 shown in FIG. 2 according to another embodiment of the present invention, wherein the scheme shown in FIG. 4 may comprise the scheme shown in FIG. 3. As shown in FIG. 4, the expander control circuits 1121-2 and 1122-2 (denoted as "EXPANDER1" and "EXPANDER2", respectively) may be implemented as copies of the aforementioned two expanders EXPANDER1 and EXPANDER2, and may be an example of the second set of expander control circuits. As shown in FIG. 4, the second expansion module 110-2 in this embodiment may be implemented as an enclosure for configuring the expander control circuits 1121-2 and 1122-2, and the second set of hard drives such as the hard drives 320-2, wherein the expander control circuits 1121-2 and 1122-2 may be electrically coupled to the expander control circuits 1121-1 and 1122-1 through SAS cables.

According to this embodiment, signal transmissions between the second set of expander control circuits and the heartbeat monitoring path may be implemented with a general purpose input/output (GPIO) control unit in the expander control circuit 1121-2, a GPIO control unit in the expander control circuit 1122-2, and multiple wirings between the GPIO control unit in the expander control circuit 1121-1 and the GPIO control unit in the expander control circuit 1122-1. For example, the hybrid management paths 114-2 may be configured in a PCB in the second expansion module 110-2, such as the back panel of the second expansion module 110-2, wherein the expander control circuits 1121-2 and 1122 are coupled to the back panel. Note that the hybrid management paths 114-2 configured between the expander control circuits 1121-2 and 1122-2 are the internal wirings in the second expansion module 110-2 internal wirings, and are not network cables between the set of management modules (e.g. the management modules 310-1 and 310-2). Some features in this embodiment similar to those mentioned in the above embodiments/modifications are omitted here for brevity.

According to some embodiments, when the heartbeat monitoring paths in the hybrid management paths 114-1 of the first expansion module 110-1 are abnormal, any management module of the set of management modules (such as the management modules 310-1 and 310-2) may monitor whether another management module within the set of management modules survives through one of the heartbeat monitoring paths in the hybrid management paths 114-2 of the second expansion module 110-2.

According to some embodiments, when the heartbeat monitoring paths in the hybrid management paths 114-1 of the first expansion module 110-1 are abnormal, any management module within the set of management modules (e.g. the management modules 310-1 and 310-2) may monitor whether another management module of the set of management modules survives through one of the heartbeat monitoring paths of any other expansion module (e.g. the second expansion module 110-2, or any follow-up expansion module) in the scheme shown in FIG. 4.

Figure 5:
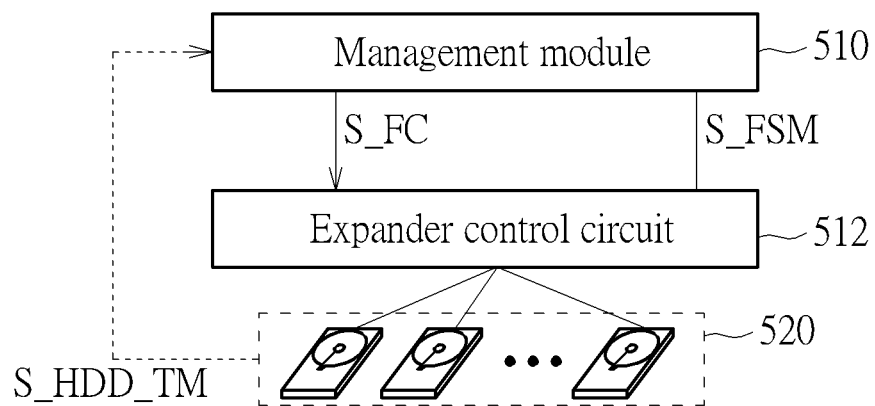
FIG. 5 is a diagram illustrating a fan control scheme related to the method shown in FIG. 2.

FIG. 5 is a diagram illustrating a fan control scheme related to the method 200 shown in FIG. 2 according to an embodiment of the present invention. For example, the management module 510, the expander control circuit 512 and the hard drive 520 may be the management module 310-1, the expander control circuit 1121-1 and the hard drive 320-1, respectively. In another example, the management module 510, the expander control circuit 512 and the hard drive 520 may be the management module 310-2, the expander control circuit 1122-1 and the hard drive 320-1, respectively. In another example, the management module 510, the expander control circuit 512 and the hard drive 520 may be the management module 310-1, the expander control circuit 1121-2 and the hard drive 320-2, respectively. In yet another example, the management module 510, the expander control circuit 512 and the hard drive 520 may be the management module 310-2, the expander control circuit 1122-2 and the hard drive 320-2, respectively. In still another example, the management module 510, the expander control circuit 512 and the hard drive 520 may be the management module 310-1, a corresponding expander control circuit in any follow-up expansion module and a hard drive within the follow-up expansion module, respectively. In another example, the management module 510, the expander control circuit 512 and hard drive 520 may be the management module 310-2, a corresponding expander control circuit in any follow-up expansion module, and a hard drive in the follow-up expansion module, respectively.

According to this embodiment, the expander control circuit 512 may be coupled to a fan, and the expander control circuit 512 may obtain the fan state monitoring information S_FSM, and transmit the fan state monitoring information S_FSM to the management module 510. Further, the hard drive 520 may generate corresponding temperature monitoring information, and the expander control circuit 512 may obtain the temperature monitoring information from the hard drive 520 and forward the temperature monitoring information to the management module 510. For brevity, the temperature monitoring information of this embodiment may be represented by the hard drive temperature monitoring information S_HHD_TM, wherein the dotted arrow between the hard drive 520 and the management module 510 is merely for indicating that the hard drive temperature monitoring information S_HHD_TM will be delivered to the management module 510. Moreover, the management module 510 (e.g. the program module executed on the management module 510) refers to the fan state monitoring information S_FSM to monitor the fan, and refers to the hard drive temperature monitoring information S_HHD_TM to generate the fan control command S_FC, in order to control the fan through the expander control circuit 512.

Based on the scheme shown in FIG. 5, through software monitoring (e.g. the program module executed on the management module 510) on the enclosure side, the configurations of the additional temperature sensor and fan controller mentioned in related arts can be saved. Further, regarding the enclosure for configuring the expander control circuit 512, the heat is mainly generated from the hard drive therein, such as the hard drive 520 shown in FIG. 5. In this embodiment, the program module executed on the management module 510 may read the temperature of the hard drive 520 using the small computer system interface (SCSI) command in order to determine whether the revolution speed of the fan needs to be adjusted, and may then selectively adjust the revolution speed of the fan, e.g. using the SCSI command to indicate the expander control circuit 512 to adjust the revolution speed of the fan. Hence, the program module in the management module 510 may properly control the temperature of the enclosure.

Figure 6:
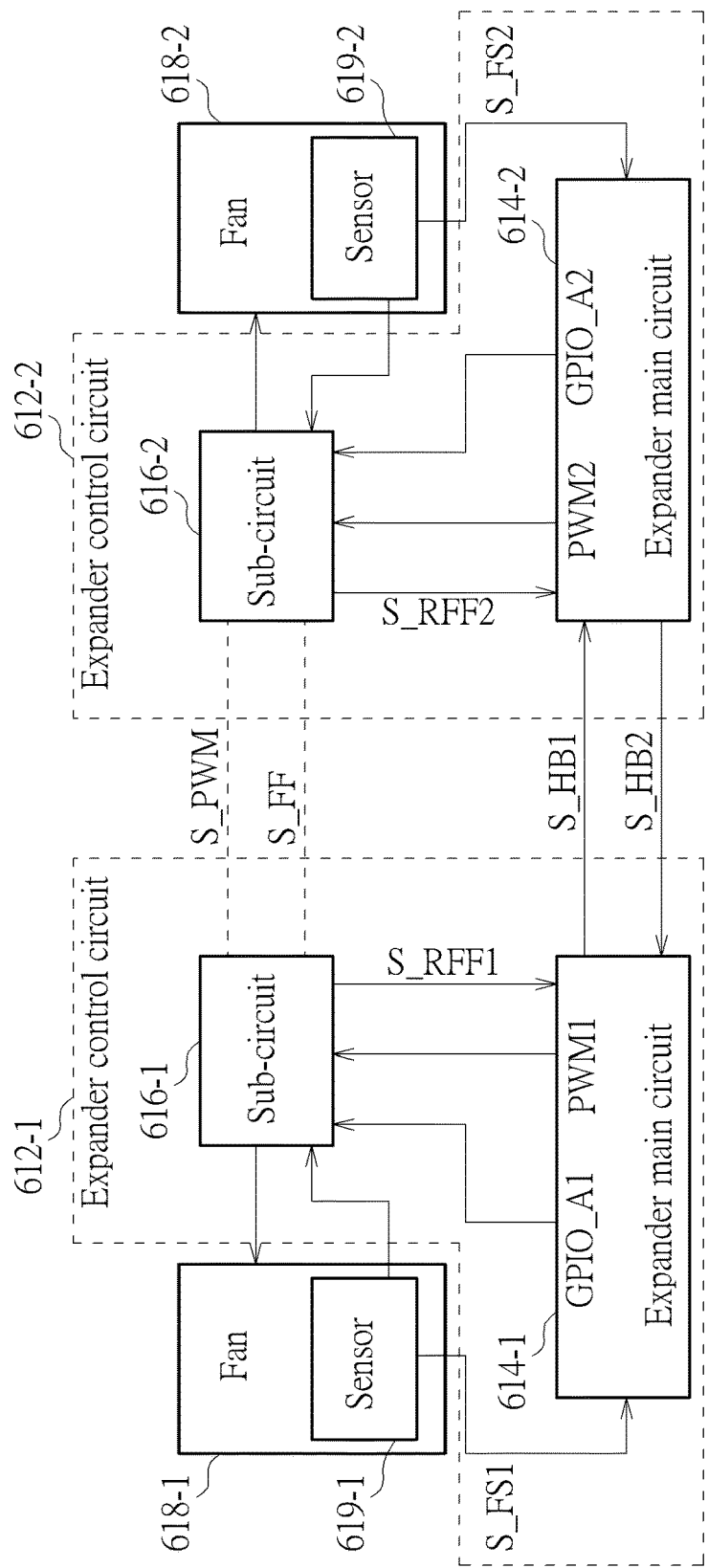
FIG. 6 is a diagram illustrating a hybrid management scheme related to the method shown in FIG. 2.

FIG. 6 is a diagram illustrating a hybrid management (HA) scheme related to the method 200 shown in FIG. 2 according to an embodiment of the present invention. The scheme shown in FIG. 6 may comprise the expander control circuits 612-1 and 612-2. As shown in FIG. 6, the expander control circuit 612-1 may comprise an expander main circuit 614-1 and a sub-circuit 616-1, both coupled to the fan 618-1 (more particularly, the sensor 619-1 therein). Further, the expander control circuit 612-2 may comprise an expander main circuit 614-2 and a sub-circuit 616-2, both coupled to the fan 618-2 (more particularly the sensor 619-2 therein).

In FIG. 6, a path for transmitting a fan fail (FF) monitoring signal S_FF may be an example of the aforementioned FF monitoring path, and a path for transmitting a pulse width modulation (PWM) control signal S_PWM may be an example of the aforementioned PWM control path, wherein each of the two paths in this embodiment may be a two-directional signal path, and a heartbeat monitoring path for transmitting the heartbeat monitoring signals S_HB1 and S_HB2 may be an example of the aforementioned heartbeat monitoring paths. In practice, a backboard mentioned above can be configured for the set of hybrid management paths in FIG. 6 (e.g. the paths for transmitting the FF monitoring signal S_FF, the PWM control signal S_PWM, and the heartbeat monitoring signals S_HB1 and S_HB2). The sub-circuits 616-1 and 616-2 may be configured closer to this backboard than the expander main circuits 614-1 and 614-2, respectively. In this situation, the path for transmitting heartbeat monitoring signal S_HB1 may start from the expander main circuit 614-1 to the expander main circuit 614-2, through the sub-circuits 616-1 and 616-2, and the path for transmitting heartbeat monitoring signal S_HB2 may start from the expander main circuit 614-2 to the expander main circuit 614-1, through the sub-circuits 616-2 and 616-1. The two paths for transmitting the heartbeat monitoring signals S_HB1 and S_HB2 are not necessarily through the sub-circuit 616-2 and 616-1. For brevity, the two paths for transmitting the heartbeat monitoring signals S_HB1 and S_HB2 are depicted between the expander main circuits 614-1 and 614-2 in FIG. 6.

According to this embodiment, each of the expander control circuits 612-1 and 612-2 may have the ability of operating the expander control circuit 512. For example, the expander control circuits 612-1 and 612-2 may represent the expander control circuits 1121-1 and 1122-1, respectively. In this situation, based on the fan control scheme shown in FIG. 5, the management module 310-1 may utilize the expander control circuit 612-1 (e.g. the expander control circuit 1121-1) to control the fan 618-1, and the management module 310-2 may utilize the expander control circuit 612-2 (e.g. the expander control circuit 1122-1) to control the fan 618-2. In another example, the expander control circuits 612-1 and 612-2 may represent the expander control circuits 1121-2 and 1122-2, respectively. In this situation, based on the fan control scheme shown in FIG. 5, the management module 310-1 may utilize the expander control circuit 612-1 (e.g. the expander control circuit 1121-2) to control the fan 618-1, and the management module 310-2 may utilize the expander control circuit 612-2 (e.g. the expander control circuit 1122-2) to control the fan 618-2.

Based on the scheme shown in FIG. 6, the expander control circuit 612-1 refers to the heartbeat monitoring signal S_HB2 to confirm whether the expander control circuit 612-2 is under the control of the management module 310-2, and determines whether the management module 310-2 is controlling the fan 618-2 through the expander control circuit 612-2. Further, the expander main circuit 614-1 may comprise a general purpose input/output terminal GPIO_A1 and a PWM control terminal PWM1, wherein the expander main circuit 614-1 may selectively output an enabling signal or a disabling signal through the general purpose input/output terminal GPIO_A1, and may output a PWM control signal through the PWM control terminal PWM1. When the expander main circuit 614-1 outputs the enabling signal to the sub-circuit 616-1 through the general purpose input/output terminal GPIO_A1, the sub-circuit 616-1 may transmit this PWM control signal or a derivation signal thereof (e.g. another PWM control signal corresponding to this PWM control signal) to the fan 618-1, and may receive an FF monitoring signal from the expander control circuit 612-2. Whenever necessary, the expander control circuit 612-2 may generate this FF monitoring signal. For example, when the sub-circuit 616-1 receives the FF monitoring signal from the expander control circuit 612-2, the sub-circuit 616-1 may utilize this FF monitoring signal as a remote fan fail (RFF) monitoring signal S_RFF1, and output the RFF monitoring signal S_RFF1 to the expander main circuit 614-1. Hence, whenever necessary, the management module 310-1 may utilize the expander control circuit 612-1 to monitor whether the fan 618-2 operates normally or not. Moreover, the sensor 619-1 may sense the operation of the fan 618-1, and correspondingly generate the fan sensing signal S_FS1. Hence, the expander control circuit 612-1 may obtain the state of the fan 618-1 from the fan sensing signal S_FS1.

The operation of the scheme illustrated in the right half of FIG. 6 is similar to that of the scheme illustrated in the left half of FIG. 6, wherein the expander main circuit 614-2 may comprise a general purpose input/output terminal GPIO_A2 and a PWM control terminal PWM2, and the expander main circuit 614-2 may selectively output an enabling signal or a disabling signal through the general purpose input/output terminal GPIO_A2, and may output a PWM control signal through the PWM control terminal PWM2. Note that, when the expander main circuit 614-2 outputs the enabling signal to the sub-circuit 616-2 through the general purpose input/output terminal GPIO_A2, the sub-circuit 616-2 may receive an FF monitoring signal from the expander control circuit 612-1. For example, when the sub-circuit 616-2 receives the FF monitoring signal from the expander control circuit 612-1, the sub-circuit 616-2 may utilize the FF monitoring signal as an RFF monitoring signal S_RFF2, and output the RFF monitoring signal S_RFF2 to the expander main circuit 614-2. Whenever necessary, the management module 310-2 may utilize the expander control circuit 612-2 to monitor whether the fan 618-1 operates normally.

Figure 7:
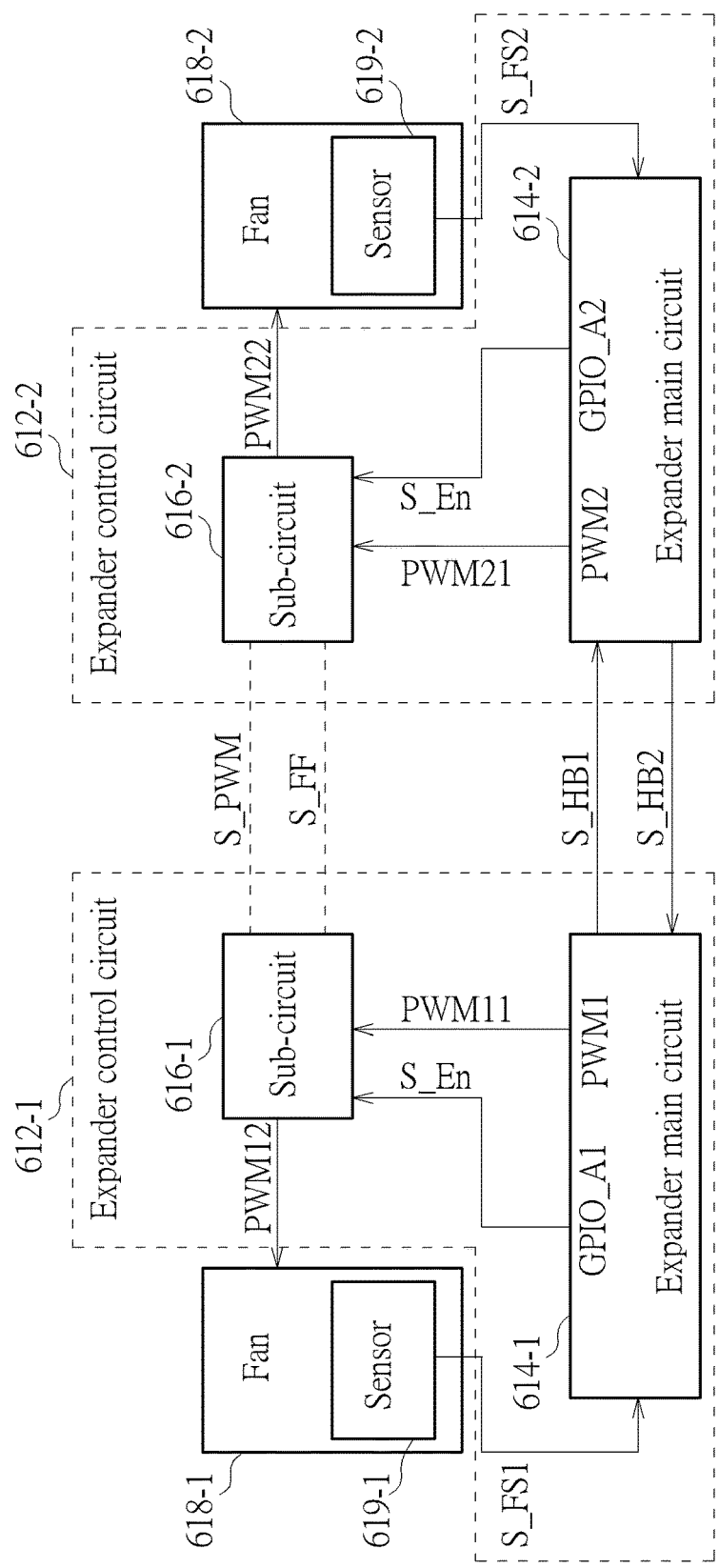
FIG. 7 is a diagram illustrating a non-taking-over configuration related to the method shown in FIG. 2.

FIG. 7 is a diagram illustrating a non-taking-over configuration related to the method 200 shown in FIG. 2 according to an embodiment of the present invention, wherein the non-taking-over configuration in FIG. 7 is one of a plurality of configurations shown in FIG. 6.

In this embodiment, an enabling signal S_En generated by the expander main circuit 614-1 may be an example of the aforementioned enabling signal outputted through the general purpose input output terminal GPIO_A1. A PWM control signal PWM11 generated by the expander main circuit 614-1 may be an example of the aforementioned PWM control signal outputted through the PWM control terminal PWM1, wherein a PWM control signal PWM12 outputted by the sub-circuit 616-1 may be the PWM control signal PWM11 or a derivation signal thereof (e.g. the PWM control signal generated by multiplying the duty cycle of the PWM control signal PWM11 by a predetermined ratio). When the expander main circuit 614-1 outputs the enabling signal S_En through the general purpose input output terminal GPIO_A1, the expander control circuit 612-1 may utilize the PWM control signal PWM11 and the PWM control signal PWM12 to control the fan 618-1, and refer to the fan sensing signal S_FS1 to determine whether the fan 618-1 fails.

When the expander control circuit 612-1 (or the storage system in other embodiments) boots up, the expander main circuit 614-1 may output the enabling signal S_En to the sub-circuit 616-1 in a default manner, which makes the expander control circuit 612-1 capable of controlling the fan 618-1 by itself. More particularly, the expander control circuit 612-1 can control the fan 618-1 according to temperature monitoring information of hard drives shared by the expander control circuits 612-1 and 612-2. In another example, after the expander control circuit 612-1 (or the storage system in other examples) is booted, the management module 310-1 refers to the fan control scheme shown in FIG. 5 to control the fan 618-1 through the expander control circuit 612-1, wherein the management module 310-1 may obtain the temperature monitoring information of the hard drives shared by the expander control circuits 612-1 and 612-2 through the expander control circuit 612-1, and control the fan 618-1 according to the temperature monitoring information.

The operation of the scheme illustrated in the right half of FIG. 7 is similar to the scheme illustrated in the left half of FIG. 7, wherein another enabling signal S_En generated by the expander main circuit 614-2 may be an example of the aforementioned enabling signal outputted through the general purpose input/output terminal GPIO_A2; a PWM control signal PWM21 generated by the expander main circuit 614-2 may be an example of the aforementioned PWM control signal outputted through the PWM control terminal PWM2; and a PWM control signal PWM22 outputted by the sub-circuit 616-2 may be the PWM control signal PWM21 or the derivation signal thereof, e.g. the PWM control signal generated by multiplying the duty cycle of the PWM control signal PWM21 by a predetermined ratio. Some features in this embodiment similar to those mentioned in the above embodiments/modifications are omitted here for brevity.

Figure 8:
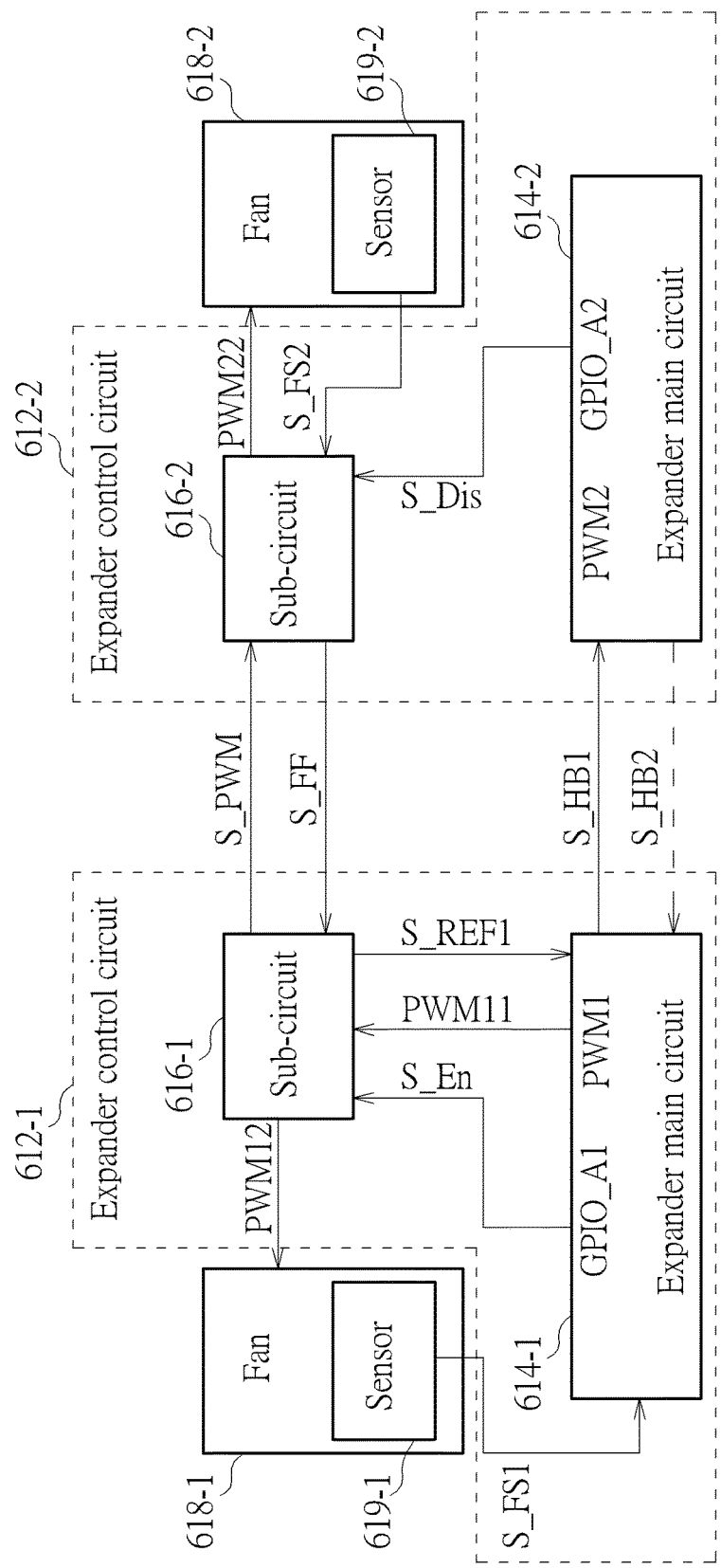
FIG. 8 is a diagram illustrating a taking-over configuration related to the method shown in FIG. 2.

FIG. 8 is a diagram illustrating a taking-over configuration related to the method 200 shown in FIG. 2 according to an embodiment of the present invention, wherein the taking-over configuration is another configuration of the plurality of configurations shown in the scheme of FIG. 6. In FIG. 8, the path for transmitting the FF monitoring signal S_FF and the path for transmitting the PWM control signal S_PWM are marked with arrows in opposite directions, in order to indicate that the FF monitoring signal S_FF is generated by the expander control circuit 612-2 and transmitted by the expander control circuit 612-1, and the PWM control signal S_PWM is generated by the expander control circuit 612-1 and transmitted to the expander control circuit 612-2 based on the taking-over configuration.

In this embodiment, the expander main circuit 614-1 may still generate the enabling signal S_En and the PWM control signal PWM11, so that the expander control circuit 612-1 may utilize the PWM control signal PWM11 and the PWM control signal PWM12 to control the fan 618-1, and refer to the fan sensing signal S_FS1 to determine whether the fan 618-1 fails or not. For example, the management module 310-1 refers to the fan control scheme shown in FIG. 5 to control the fan 618-1 through the expander control circuit 612-1, wherein the management module 310-1 may obtain the temperature monitoring information of the hard drives shared by the expander control circuits 612-1 and 612-2, and control the fan 618-1 according to the temperature monitoring information. Further, when the expander control circuit 612-1 does not detect the heartbeat monitoring signal S_HB2, it means that the management module 310-2 has broken down, or the management module 310-2 cannot control the fan 618-2 through the expander control circuit 612-2. Since the management module 310-1 may have monitored the heartbeat monitoring signal S_HB2 through the expander control circuit 612-1, when the expander control circuit 612-1 does not detect the heartbeat monitoring signal S_HB2, the management module 310-1 may be informed of this situation, and the management module 310-1 may take over the management of the fan 618-2. Based on the taking-over configuration in this embodiment, the management module 310-1 may also apply the fan control scheme shown in FIG. 5 to the management on the fan 618-2 performed by the management module 310-1.

As shown in FIG. 8, a disabling signal S_Dis generated by the expander main circuit 614-2 may be an example of the aforementioned disabling signal outputted through the general purpose input/output terminal GPIO_A2. When the expander control circuit 612-2 (more particularly the expander main circuit 614-2) determines that the management module 310-2 fails, or the management module 310-2 cannot connect with the expander control circuit 612-2 (e.g. the expander control circuit 612-2 does not detect any heartbeat monitoring information from the management module 310-2), the expander control circuit 612-2 may utilize the expander main circuit 614-2 to generate the disabling signal S_Dis, and stop outputting the heartbeat monitoring signal S_HB2. Based on the taking-over configuration in this embodiment, under the situation that the expander main circuit 614-1 outputs the enabling signal S_En to the sub-circuit 616-1 and the expander main circuit 614-2 outputs the disabling signal S_Dis to the sub-circuit 616-2, the PWM control signal S_PWM will be transmitted to the expander control circuit 612-2 from the expander control circuit 612-1. For example, the PWM control signal S_PWM may equal the PWM control signal PWM11, and the PWM control signal PWM22 may be the PWM control signal S_PWM or the derivation signal thereof (e.g. a PWM control signal generated by multiplying the duty cycle of the PWM control signal S_PWM by a predetermined ratio).

In another example, the PWM control signal S_PWM may equal the PWM control signal PWM12, and the PWM control signal PWM22 may be the PWM control signal S_PWM or the derivation signal thereof (e.g. a PWM control signal generated by multiplying the duty cycle of the PWM control signal S_PWM by a predetermined ratio). Further, the expander control circuit 612-1 may receive the FF monitoring signal S_FF from the expander control circuit 612-2, wherein the FF monitoring signal S_FF in this embodiment may be generated by the sub-circuit 616-2. When the sub-circuit 616-2 keeps failing to read the revolution speed of the fan (e.g. the sub-circuit 616-2 fails to detect the fan sensing signal S_FS2) for a predetermined period, e.g. 10 seconds, the sub-circuit 616-2 may transmit the FF monitoring signal S_FF. Due to the design in the taking-over configuration related to the general purpose input/output terminals GPIO_A1 and GPIO_A2, the PWM control signal S_PWM and the FF monitoring signal S_FF, the scheme shown in FIG. 8 may monitor and control both the fans 618-1 and 618-2, even when only the expander control circuit 612-1 is connected to the management module 310-1.

Figure 9:
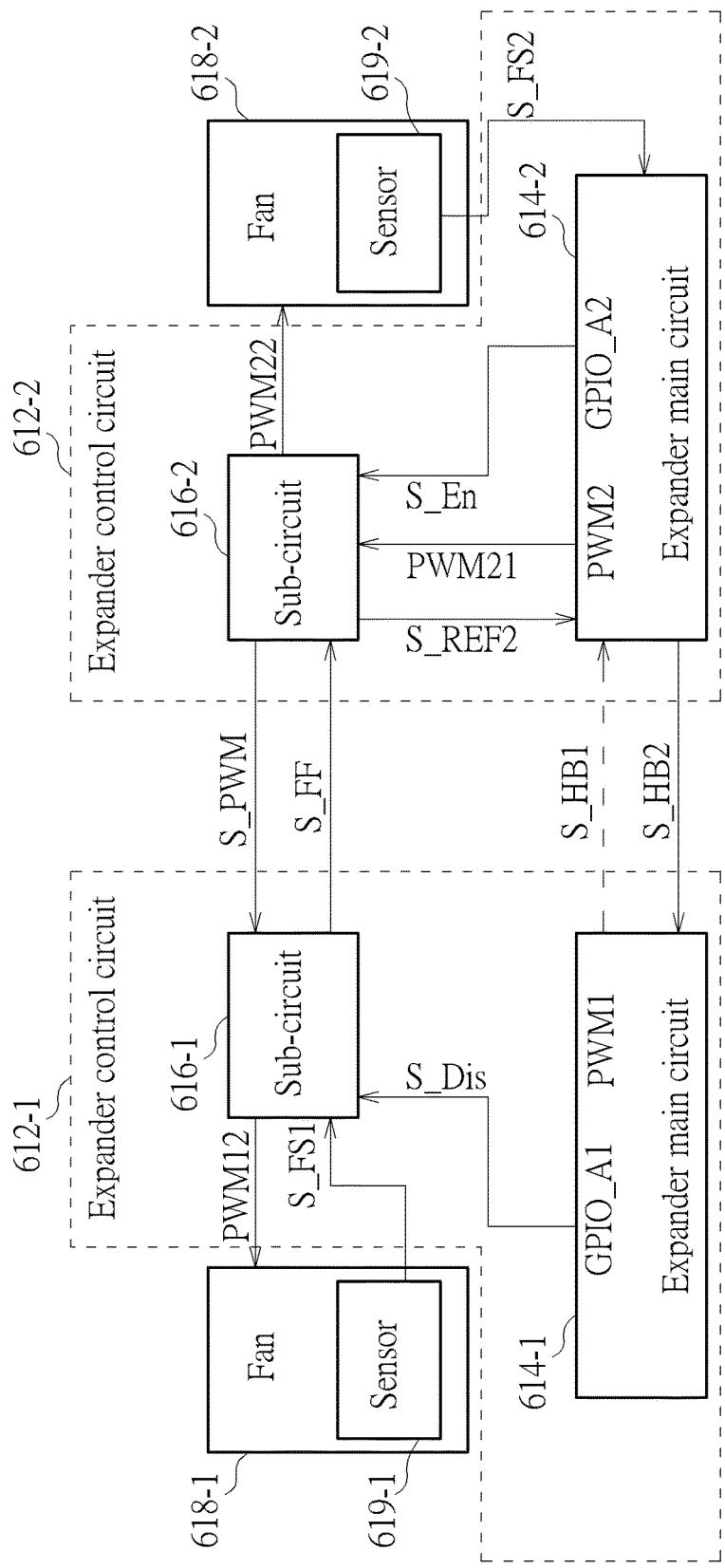
FIG. 9 is a diagram illustrating a taking-over configuration related to the method shown in FIG. 2.

FIG. 9 is a diagram illustrating a taking-over configuration related to the method 200 shown in FIG. 2 according to another embodiment of the present invention, wherein the taking-over configuration is another configuration in the plurality of configurations of the scheme shown in FIG. 6. In FIG. 9, the aforementioned path for transmitting the FF monitoring signal S_FF and the aforementioned path for transmitting the PWM control signal S_PWM are marked with arrows in different directions, to indicate that, based on the taking-over configuration in this embodiment, the FF monitoring signal S_FF is generated by the expander control circuit 612-1 and transmitted to the expander control circuit 612-2, and the PWM control signal S_PWM is generated by the expander control circuit 612-2 and transmitted to the expander control circuit 612-1.

The operation of the scheme shown in the right half of FIG. 9 is similar to the operation of the scheme shown in the left half of FIG. 9, wherein a disabling signal S_Dis generated by the expander main circuit 614-1 may be an example of the aforementioned disabling signal outputted through the general purpose input output terminal GPIO_A1.

According to some embodiments, when the expander control circuits 612-1 and 612-2 (or the storage system in some embodiments) is booted, each of the general purpose input/output terminals GPIO_A1 and GPIO_A2 will be preset as an enabling state (more particularly, by outputting an enabling signal S_En). Hence, the revolution speeds of the fans 618-1 and 618-2 may remain at the default settings of the expander control circuits 612-1 and 612-2, respectively, until the management modules 310-1 and 310-2 take over the control of the fans 612-1 and 612-2. The default settings of the expander control circuits 612-1 and 612-2 may set the preset revolution speeds of the fans 612-1 and 612-2 to low. In general, before the management modules 310-1 and 310-2 take over control, reading/writing operations are not performed on a hard drive. A low revolution speed is therefore sufficient for avoiding the heat generated from the expander control circuits 612-1 and 612-2. Moreover, the revolution speed may avoid generating large noise when booting the apparatus.

According to some embodiments, after the expander control circuits 612-1 and 612-2 (or the storage system in other embodiments) are booted, since both sides of each of the expander control circuits 612-1 and 612-2 will couple to the management modules 310-1 and 310-2, respectively, when the expander control circuits 612-1 receives the heartbeat monitoring signal S_HB2 from another side of the expander control circuit 612-2 and the expander control circuits 612-2 receives the heartbeat monitoring signal S_HB1 from the expander control circuit 612-1, it means the management modules 310-2 take over the control of the expander control circuit 612-2 and the management modules 310-1 take over the control of the expander control circuit 612-1. The expander control circuits 612-1 and 612-2 need to confirm whether the expander control circuits 612-1 and 612-2 are controlled by the management modules 310-1 and 310-2, respectively. If the expander control circuits 612-1 and 612-2 have confirmed that they are controlled by the management modules 310-1 and 310-2, respectively, it means that the management modules 310-1 and 310-2 are taking over the control, and thus the configurations do not need to be changed. If one of the expander control circuits 612-1 and 612-2 confirms it is not controlled by a corresponding management module control, it means that there is only one management module taking over the control, and thus this expander control circuit will control its general purpose input/output terminal (e.g. the general purpose input output terminals GPIO_A1 or GPIO_A2) to output a disabling signal S_Dis, to deliver the control of a corresponding fan to this management module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a storage system by utilizing a hybrid management path, the storage system comprising a plurality of shared storage devices, the method comprising:
    providing at least one heartbeat monitoring path between a first set of expander control circuits of a first expansion module in the storage system, for transmitting at least one of a plurality of heartbeat monitoring signals for a set of management modules in the storage system, wherein the expansion module is utilized for installing a first shared storage device set of a plurality of sets of shared storage devices, and each shared storage device of the first shared storage device set is coupled to the first set of expander control circuits, to allow the set of management modules to control the first shared storage device set through the first set of expander control circuits; and
    performing heartbeat monitoring upon the set of management modules according to the heartbeat monitoring signals, for at least one of the management modules to perform high availability management upon the plurality of shared storage devices, and selectively take over management of at least one non-shared component of the first expansion module, wherein the storage system is constructed as a high availability cluster;
    wherein the step of performing heartbeat monitoring upon the set of management modules according to the heartbeat monitoring signals for at least one of the management modules to perform high availability management upon the plurality of shared storage devices and selectively taking over management of the non-shared component of the first expansion module further comprises:
        utilizing a survival command transmitted by a management module of the set of management modules to an expander control circuit of the first set of expander control circuits, for the expander control circuit to determine whether to notify another expander control circuit of the first set of expander control circuits of a survival state or a non-survival state of the management module, to allow another management module of the set of management modules to be aware of the survival state or the non-survival state of the management module through the other expander control circuit.

2. The method of claim 1, wherein the management module of the set of management modules utilizes a corresponding expander control circuit of the first set of expander control circuits to take over the management of the non-shared component of the first expansion module, wherein the non-shared component of the first expansion module is positioned in one of the first set of expander control circuits except for the corresponding expander control circuit, or coupled to the corresponding expander control circuit of the first set of expander control circuits through said one of the first set of expander control circuits.

3. The method of claim 2, wherein the non-shared component of the first expansion module comprises at least one hardware component of said one of the first set of expander control circuits.

4. The method of claim 2, wherein the non-shared component of the first expansion module comprises a fan.

5. The method of claim 4, further comprising:
    providing at least one fan fail (FF) monitoring path between the first set of expander control circuits, to make an FF monitoring signal corresponding to the fan be transmitted from said one of the first set of expander control circuits to the corresponding expander control circuit of the first set of expander control circuits, wherein the hybrid management paths comprise the FF monitoring path;
    wherein the management module of the set of management modules utilizes the corresponding expander control circuit of the first set of expander control circuits, to monitor whether the fan fails or not according to whether the FF monitoring signal is received or not.

6. The method of claim 4, further comprising:
    providing at least one pulse width modulation control path between the first set of expander control circuits, to transmit a pulse width modulation (PWM) control signal corresponding to the fan to said one of the first set of expander control circuits from the corresponding expander control circuit of the first set of expander control circuits, wherein the hybrid management paths comprise the pulse width modulation control path;

wherein the management module of the set of management modules utilizes the corresponding expander control circuit of the first set of expander control circuits to take over the management of the fan according to the PWM control signal.

7. The method of claim 1, wherein when the expander control circuit of the first set of expander control circuits receives the survival command from the management module of the set of management modules, setting an output terminal of the expander control circuit as a first logic state, to notify the other expander control circuit of the first set of expander control circuits of the survival state of the management module, to allow the other management module of the set of management modules to be aware of the survival state of the management module through the other expander control circuit.

8. The method of claim 1, wherein the step of performing heartbeat monitoring upon the set of management modules according to the heartbeat monitoring signals for at least one of the management modules to perform high availability management upon the plurality of shared storage devices and selectively taking over management of the non-shared component of the first expansion module further comprises:

when a period of the expander control circuit of the first set of expander control circuits not receiving the survival command from a corresponding management module of the set of management modules reaches a predetermined time threshold, setting an output terminal of the expander control circuit as a second logic state, to notify the other expander control circuit of the first set of expander control circuits of the non-survival state of the management module, to allow the other management module of the set of management modules to be aware of the non-survival state of the management module through the other expander control circuit.

9. The method of claim 1, wherein a set of hybrid management paths of the hybrid management paths comprises the heartbeat monitoring path between the first set of expander control circuits, and the set of hybrid management paths is at least one internal wirings of the first expansion module, rather than any network cable between the set of management modules.

10. An apparatus for managing a storage system by utilizing a hybrid management path, the storage system comprising a plurality of shared storage devices, the apparatus comprising:

a first expansion module, positioned in the storage system, the first expansion module arranged to install a first shared storage device set of the plurality of shared storage devices, wherein the first expansion module comprises:

a first set of expander control circuits, coupled to a set of management modules in the storage system, wherein each shared storage device of the first shared storage device set is coupled to the first set of expander control circuits, to allow the set of management modules to control the first shared storage device set through the first set of expander control circuits; and at least one heartbeat monitoring path, positioned between the first set of expander control circuits, the heartbeat monitoring path arranged to transmit at least one of a plurality of heartbeat monitoring signals for the set of management modules, wherein the hybrid management paths comprise the heartbeat monitoring path, and the apparatus performs heartbeat monitoring upon the set of management modules according to the plurality of heartbeat monitoring signals, for at least one of the management modules to perform high availability management upon the plurality of shared storage devices, and selectively take over management of at least one non-shared component of the first expansion module, wherein the storage system is constructed as a high availability cluster;

wherein the apparatus utilizes a management module of the set of management modules to transmit a survival command to an expander control circuit of the first set of expander control circuits, for the expander control circuit to determine whether to notify another expander control circuit of the first set of expander control circuits of a survival state or a non-survival state of the management module, to allow another management module of the set of management modules to be aware of the survival state or the non-survival state of the management module through the other expander control circuit.

11. The apparatus of claim 10, wherein the management module of the set of management modules utilizes a corresponding expander control circuit of the first set of expander control circuits, to take over the management of the non-shared component of the first expansion module, wherein the non-shared component of the first expansion module is positioned in one of the first set of expander control circuits except for the corresponding expander control circuit, or coupled to the corresponding expander control circuit of the first set of expander control circuits through said one of the first set of expander control circuits.

12. The apparatus of claim 11, wherein the non-shared component in the first expansion module comprises:

at least one hardware component of said one of the first set of expander control circuits.

13. The apparatus of claim 11, wherein the non-shared component in the first expansion module comprise a fan.

14. The apparatus of claim 13, wherein the first expansion module comprise:

at least one fan fail (FF) monitoring path, positioned between the first set of expander control circuits, and arranged to transmit an FF monitoring signal corresponding to the fan from said one of the first set of expander control circuits to the corresponding expander control circuit of the first set of expander control circuits, wherein the hybrid management paths comprise the FF monitoring path;

wherein the management module of the set of management modules utilizes the corresponding expander control circuit of the first set of expander control circuits, to monitor whether the fan fails or not according to whether the FF monitoring signal is received or not.

15. The apparatus of claim 13, wherein the first expansion module comprise:

at least one pulse width modulation control path, positioned between the first set of expander control circuits, and arranged to transmit a pulse width modulation (PWM) control signal corresponding to the fan from the corresponding expander control circuit of the first set of expander control circuits to said one of the first set of expander control circuits, wherein the hybrid management paths comprise the pulse width modulation control path;

wherein the management module of the set of management modules utilizes the corresponding expander control circuit of the first set of expander control circuits, to take over the management of the fan according to the PWM control signal.

16. The apparatus of claim 10, wherein when the expander control circuit of the first set of expander control circuits receives the survival command from the management module of the set of management modules, the expander control circuit sets an output terminal of the expander control circuit as a first logic state, to notify the other expander control circuit of the first set of expander control circuits of the survival state of the management module, to allow the other management module of the set of management modules to be aware of the survival state of the management module through the other expander control circuit.

17. The apparatus of claim 10, when a period of the expander control circuit of the first set of expander control circuits not receiving the survival command from a corresponding management module of the set of management modules reaches a predetermined time threshold, the expander control circuit sets an output terminal of the expander control circuit as a second logic state, to notify the other expander control circuit of the first set of expander control circuits of the non-survival state of the management module, to allow the other management module of the set of management modules to be aware of the non-survival state of the management module through the other expander control circuit.

18. The apparatus of claim 10, wherein a set of hybrid management paths of the hybrid management paths comprise the heartbeat monitoring path between the first set of expander control circuits, and the set of hybrid management paths is at least one internal wirings of the first expansion module, rather than any network cable between the set of management modules.

* * * * *